(12) United States Patent
Connors, Jr.

(10) Patent No.: US 8,007,670 B2
(45) Date of Patent: Aug. 30, 2011

(54) LAMINATED CASSETTE DEVICE AND METHODS FOR MAKING SAME

(75) Inventor: John F. Connors, Jr., Shrewsbury, MA (US)

(73) Assignee: Tangenx Technology Corporation, Shrewsbury, MA (US)

(*) Notice: Subject to any disclaimer, the term of this patent is extended or adjusted under 35 U.S.C. 154(b) by 378 days.

(21) Appl. No.: 11/518,803

(22) Filed: Sep. 11, 2006

(65) Prior Publication Data
US 2007/0056894 A1 Mar. 15, 2007

Related U.S. Application Data

(60) Provisional application No. 60/715,898, filed on Sep. 9, 2005.

(51) Int. Cl.
*B01D 63/08* (2006.01)
*B01D 61/18* (2006.01)
*B01D 61/14* (2006.01)

(52) U.S. Cl. ........ 210/321.61; 210/321.6; 210/321.75; 210/321.84

(58) Field of Classification Search .............. None
See application file for complete search history.

(56) References Cited

U.S. PATENT DOCUMENTS

| | | | |
|---|---|---|---|
| 2,758,083 A * | 8/1956 | Van Hoek et al. | 204/636 |
| 3,223,612 A | 12/1965 | Chen et al. | |
| 3,984,324 A * | 10/1976 | Wang | 210/232 |
| 4,025,425 A | 5/1977 | Croopnick et al. | |
| 4,624,784 A * | 11/1986 | Lefebvre | 210/321.67 |
| 4,715,955 A | 12/1987 | Friedman | |
| 4,735,718 A | 4/1988 | Peters | |
| 5,225,080 A | 7/1993 | Karbachsch et al. | |
| 5,284,718 A | 2/1994 | Chow et al. | |
| 5,342,517 A | 8/1994 | Kopf | |
| 5,599,447 A | 2/1997 | Pearl et al. | |
| 5,922,200 A | 7/1999 | Pearl et al. | |
| 6,030,539 A | 2/2000 | Zuk, Jr. | |

(Continued)

FOREIGN PATENT DOCUMENTS

WO   WO 95/06514 A1   3/1995

(Continued)

OTHER PUBLICATIONS

*Author Unknown*, "Protein Concentration and Diafiltration by Tangential Flow Filtration", Millipore Technical Brief, Lit. No. TB032, Rev. C, Jun. 2003, pp. 1-24.

(Continued)

*Primary Examiner* — Krishnan S Menon
(74) *Attorney, Agent, or Firm* — Millen, White, Zelano & Branigan, P.C.

(57) ABSTRACT

A filtration cassette is described. The filtration cassette can include one or more filtrate channel spacers and one or more feed channel spacers. Each of the feed channel spacers and each of the filtrate channel spacers define an open interior volume bounded by an inner perimeter and include at least one feed port and at least one filtrate port. The filtrate channel spacers and the feed channel spacers are arranged such that the feed ports and the filtrate ports are positioned in respective alignment. The filtration cassette further includes one or more membranes disposed between the filtrate channel spacers and the feed channel spacers, and one or more retaining members at either end of the filtration cassette. A thin film of adhesive binds together the filtrate channel spacers, the feed channel spacers, and the membranes.

25 Claims, 9 Drawing Sheets

U.S. PATENT DOCUMENTS

| | | |
|---|---|---|
| 6,368,505 B1 | 4/2002 | Grummert et al. |
| 6,524,513 B1 | 2/2003 | Pearl et al. |
| 7,094,346 B2 | 8/2006 | Osenar et al. |
| 7,097,800 B2 | 8/2006 | Vigna et al. |
| 2002/0068212 A1 | 6/2002 | Osenar et al. |
| 2003/0052054 A1* | 3/2003 | Pearl et al. ............... 210/500.21 |
| 2003/0096153 A1 | 5/2003 | Osenar et al. |
| 2005/0126981 A1 | 6/2005 | Connors, Jr. |
| 2005/0269255 A1* | 12/2005 | Herczeg ................... 210/321.71 |
| 2006/0181032 A1* | 8/2006 | Riggs et al. ................... 277/627 |

FOREIGN PATENT DOCUMENTS

| | | |
|---|---|---|
| WO | WO 98/30308 A1 | 7/1998 |
| WO | WO 00/75082 A1 | 12/2000 |

OTHER PUBLICATIONS

Holly Haughney, Ph.D. et al., "Life Sciences: Single Use Products Dispose of Cleaning", A2C2™ Magazine website (http://www.a2c2.com/articles/04jan_life.asp?pid=405&articleText=04jan_life (printout on Nov. 23, 2004), Jan. 2004, pp. 1-4.

* cited by examiner

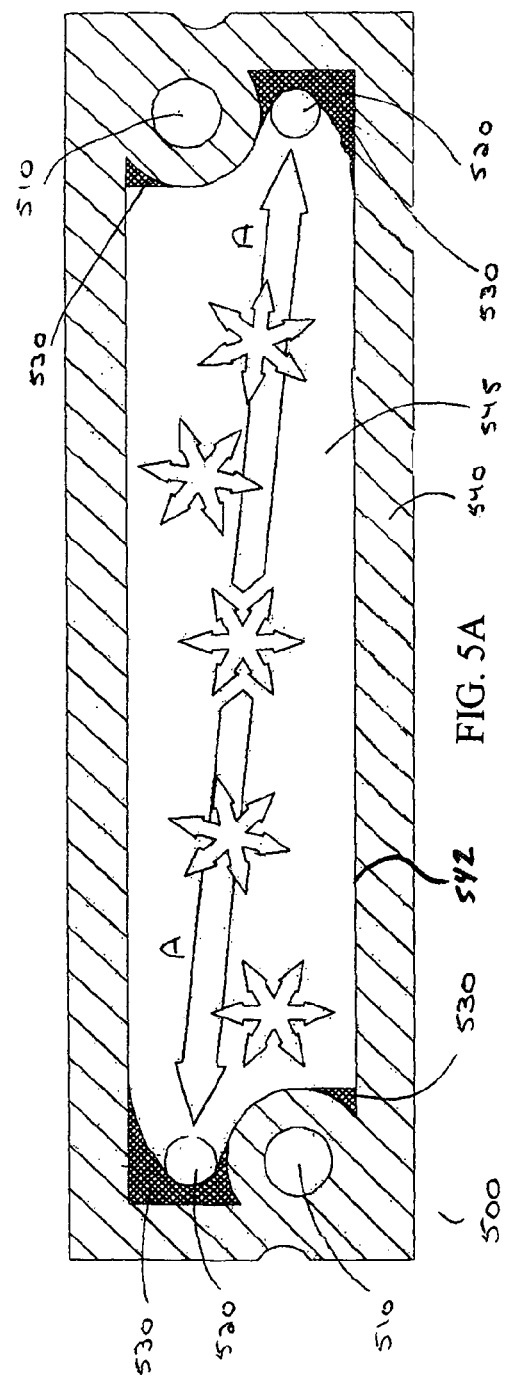
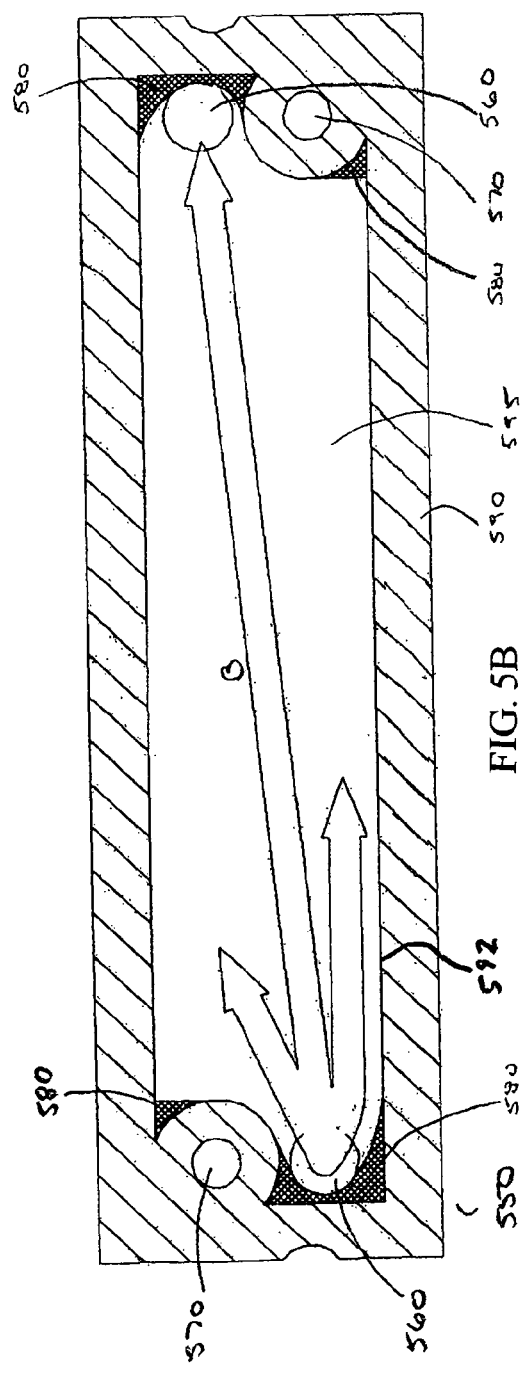
FIG. 5A
FIG. 5B
PRIOR ART

LAMINATED CASSETTE DEVICE AND METHODS FOR MAKING SAME

CROSS REFERENCE TO RELATED APPLICATION

This application is based upon and claims the benefit of priority from U.S. Provisional Application Ser. No. 60/715,898 filed Sep. 9, 2005, the entire contents of which are incorporated by reference herein.

FIELD OF THE INVENTION

This invention relates to filtration devices and more specifically to a laminated cassette for cross-flow filtration and a laminated capsule for direct-flow filtration. The invention is further directed to methods for making these devices.

BACKGROUND

Filtration is a process in which membranes are used to separate components in a liquid solution or suspension based on their size differences. Two types of filtration include tangential-flow filtration (TFF), also known as cross-flow filtration (CFF), and direct-flow filtration (DFF), also known as normal-flow filtration (NFF).

Tangential-flow or cross-flow filtration applications often use cassettes or other plate and frame formats. These plate and frame formats typically incorporate a plurality of flat sheet membranes arranged between external flat plates and manifolds. In tangential-flow or cross-flow filtration, the fluid to be filtered is passed through the inlet of the manifold, into the cassette, and tangentially to the first (or upstream) surface of the membranes. A portion of the fluid passes through each of the membranes from the first surface to the second (or downstream) surface, through the cassette and out one outlet of the manifold. Another portion of the fluid passes tangentially to the first surface of the membrane, through the cassette and out another outlet of the manifold without passing through the membranes. The fluid passing into the inlet of the manifold and into the cassette is commonly referred to as the feed. The feed contains various sized molecules and possibly debris. The fluid passing from the first surface of the membrane to the second surface of the membrane is commonly referred to as the filtrate. The filtrate contains the smaller molecules that have passed through the pores of the membrane. The fluid passing parallel to the first surface of the membrane without passing through to the second surface of the membrane is commonly referred to as retentate. The retentate contains the larger molecules that have not passed through the pores of the membrane.

Direct-flow or normal-flow filtration differs from cross-flow filtration in that the feed flow is directed towards the membrane, not tangentially across it. Particles that are too large to pass through the pores of the membrane accumulate at the membrane surface, while smaller molecules pass through to the filtrate side.

Conventional cassette encapsulation is achieved by interleaving multiple layers of screen mesh and membrane in a stack to be bound together as a cohesive stack, typically with a single or two-part liquid urethane or silicone. The stack may be bound by retaining the layers between plates while impregnating and encapsulating the edges of the stacked layers with the urethane or silicone. The encapsulated stack is often termed a cassette. However there are numerous problems associated with current urethane- or silicone-encapsulated cassettes.

For example, urethane- or silicone-encapsulated cassettes are associated with excessive extractables and leachables. Undesired contaminants from single and two-part liquid urethanes and silicones have a tendency to leach and extract into the process fluid during use or storage. These contaminants may or may not be hazardous when found in the process fluid or final product. In either case, however, they are generally undesired and preferably not present. Thus, there is a need in the art to minimize or eliminate these materials.

In addition, single and two-part urethane or silicone used in conventional cassettes are inconvenient and require long cure cycles, and the assembly process is labor intensive and not conducive to automated assembly. As a result, the build cycle for a traditional cassette is typically two to three days. Thus there is a need in the art for cassettes that have a shorter build cycle, preferably one day, and are adaptable to automated assembly.

The quality of conventional cassettes, as determined in part by variations in height, width and length, is also oftentimes inconsistent. As mentioned above, traditional cassette technology involves interleaving screen mesh and membrane prior to encapsulation. Each one of these materials, encapsulant, screen mesh and membrane, can contribute to variation in the final product. The variation is typically measured in terms of fluid flow performance. Slight variations in channel height or width from cassette to cassette will yield variable membrane flux (the rate of fluid flow through the membrane); assuming the membrane performance is consistent. Thus, there is a need in the art to minimize variations in flow channel dimensions (height, width and length) from layer to layer and cassette to cassette.

The use of single and two-part urethane or silicone also limits cassette height. The taller the cassette, the more likely the downward pressure created by the weight of the material will cause the encapsulant to settle at the lower portions of the cassette. As a result, the encapsulant may encroach on the ports at the lower portions of the cassette. For this reason, the viscosity of the encapsulant is critical. If the viscosity of the encapsulant is too low, the encapsulant will flow through the cassette too quickly. Conversely, if the viscosity of the encapsulant is too high, it will not flow adequately. To strike a balance, typical production-size cassettes are limited to approximate height between 0.5-inch and 4-inch (about 1 cm-10 cm), where the difference in sizes correlates to the number of membrane layers and corresponding feed and filtrate layers. Cassettes at the upper height range (4-inch or 10 cm) have approximately 5-times (5×) the membrane area (1×) found in a cassette at the lower height range (0.5 inch or 1 cm) for a given standard footprint. Creating cassettes beyond this range is limited by the encapsulant issues previously described. Thus, there is a need in the art for cassettes that are not limited in height by the use of the aforementioned encapsulants.

This limited cassette height in turn affects the number of gaskets used in a production assembly (a stack of multiple cassettes). A typical production-sized filter holder can accommodate four or five cassettes at 5× height, or twenty to twenty-five cassettes as 1× height, stacked between plates. As each cassette unit requires a gasket, the number of gaskets can quickly become unwieldy. Thus, there is a need in the art for taller cassettes, thus reducing the number of gaskets used in production.

Further, the single and two-part liquid urethane or silicone used in the assembly are subject to deformation after curing. As described above, the encapsulant also acts as a binder to hold the materials in place. In a typical assembly process, the un-encapsulated cassette is placed between two plates, and the stack is compressed prior to introducing the encapsulant. The cassette is released from the plate clamp after the encapsulant-curing cycle completes. The cassette will then relax to its free form state. As a result of this relaxing or settling, and depending upon the fixture compression, the stack can "pillow out" or expand beyond the rigid encapsulant frame. The channel height, and therefore the cassette height, is thus determined in part by the dimensions and shape of the now-cured encapsulant.

The channel height is also defined in part by the clamping force applied during encapsulation. Clamping force has an inverse relationship to channel height. An increase in clamping force results in a decrease in channel height. In some cases it is desirable to push the screen into the membrane, but not always. Therefore, there is a need in the art for a cassette-assembly process that permits the channel height to be uniformly adjusted.

Traditional cassettes require the end-user to re-compress the cassette in a filter holder or clamp prior to use. The filter holder or clamp may in turn reduce the flow channel height. Since fluid velocity at the membrane surface is critical to membrane flux, any variance in flow channel height will result in varying membrane flux. While most suppliers provide a clamping force range with their product, none of the suppliers currently offer a dead stop, i.e., a cassette that is clamped and compressed, but cannot be over-compressed. Thus, there is a need in the art for a cassette that cannot be over-compressed.

Traditional cassettes rely on gravity, pressure or vacuum, and encapsulant flow, to impregnate the edges of the stack and define the flow channel perimeter. This creates a fixed and sometimes undesirable relationship between the dimensions of the outer perimeter and the dimensions of the inner perimeter. Thus there is a need in the art for a cassette that decouples this relationship and allows the inner and outer perimeters to have significantly different shapes.

Traditional cassettes are also difficult to clean. Because conventional urethane and silicone cassettes rely on gravity, pressure or vacuum to impregnate edges of the stack with liquid encapsulant, the encapsulant will seek the path of least resistance, which causes non-uniformities in the inner encapsulant perimeter. In the final product, this non-uniformity in the perimeter results in non-uniformities in the feed and filtrate flow paths and results in areas where no-flow zones or "dead-spots" develop during use and cleaning. No-flow zones that are not cleaned adequately may grow bacteria because the offending materials left behind cannot be washed out. The no-flow zones may also decrease the efficiency of traditional cassettes. Thus, there is a need in the art for a cassette-assembly process that minimizes or eliminates no-flow zones.

While currently-available cassettes are often sold as reusable from two to fifty times, depending upon the process, reusable products require expensive validations. Therefore, in order to be accepted by the market, disposable products must cost less while delivering the same performance. Companies that lower the price of existing cassette technology while calling it a disposable will not fool savvy customers. Such circumstances will likely cause customer to reuse these "disposable" devices since they are identical to the higher priced reusable. Thus, there is a need in the art for a cassette product that is easy to manufacture, can be sold as a one-to five-use disposable, and fits existing hardware currently occupied by traditional cassette products.

The single and two-part liquid urethane or silicone used in conventional direct-flow filtration capsules are also subjected to compressive forces, and therefore are prone to the same issues and inefficiencies described above. Thus there is a need in the art for filtration capsules, and filtration capsule-assembly processes, that minimize or eliminate these problems.

The present invention alleviates or eliminates at least some of the disadvantages of the prior art. These and other advantages of the present invention will be apparent from the description as set forth below.

SUMMARY OF THE INVENTION

The present invention provides a new and improved filtration cassette. The filtration cassette can include one or more filtrate channel spacers and one or more feed channel spacers. Each of the feed channel spacers and each of the filtrate channel spacers define an open interior volume bounded by an inner perimeter and include at least one feed port and at least one filtrate port. The filtrate channel spacers and the feed channel spacers are arranged such that the feed ports and the filtrate ports are positioned in respective alignment. The filtration cassette further includes one or more membranes disposed between the filtrate channel spacers and the feed channel spacers, and one or more retaining members at either end of the filtration cassette. A thin film of adhesive is used to bind together the filtrate channel spacers, the feed channel spacers, and the membranes.

BRIEF DESCRIPTION OF THE DRAWINGS

Other objects, features and advantages will occur to those skilled in the art from the following description of the preferred embodiments and the accompanying drawings, in which:

FIGS. 5A and 5B are schematic views of a filtrate channel and a feed channel, respectively, in a prior art filtration cassette;

DETAILED DESCRIPTION OF THE PREFERRED EMBODIMENTS AND METHODS

The present invention relates to laminated cross-flow filtration cassettes and laminated direct-flow filtration capsules, and variations thereof, which use a thin film of adhesive to bond alternating layers of membranes and channel spacers therebetween. The channel spacers are distinct elements, formed from a material different than the thin film of adhesive, that create highly defined fluid flow boundaries within the channels. As described in more detail below, the channel spacers may be die cut or otherwise formed in precise, preselected shapes to define the perimeters of desired flow channels. The spacers can be coated with the thin film of adhesive, such as a hot melt adhesive applied by flexographic techniques or a pressure sensitive adhesive (PSA), and then laminated between the membranes. As used herein, the term "thin film of adhesive" means a bonding agent that is applied in a thickness of less than 50% the height of the adjacent channel, preferably less than 40% the height of the channel, and most preferably less than 30% of the height of the channel. It should be noted that adhesives, once applied, may infiltrate the adjacent membranes. Thus, the thickness of the adhesive layers may represent a smaller percentage of the adjacent channel heights after assembly.

Embodiments of the invention include, but are not limited to, laminated cross-flow filtration cassettes, self-contained cross-flow filtration assemblies, laminated direct-flow filtration capsules, and methods of making these devices.

Laminated Cross-Flow Filtration Cassettes

The present invention features a laminated cross-flow filtration (CFF) cassette that utilizes channel spacers coated with a thin film of adhesive, such as hot melt or PSA tape, to bond and encapsulate the alternating layers of membranes and channel spacers. When so bound, the channel spacers create precisely defined fluid flow boundaries for the channels.

A filtration cassette of the present invention may be used in a variety of small and large-scale applications requiring cross-flow filtration, and may be particularly suitable in small and large scale pharmaceutical and biopharmaceutical filtration processes including, but not limited to, the production of vaccines, monoclonal antibodies, and patient-specific treatments.

Figure 1:
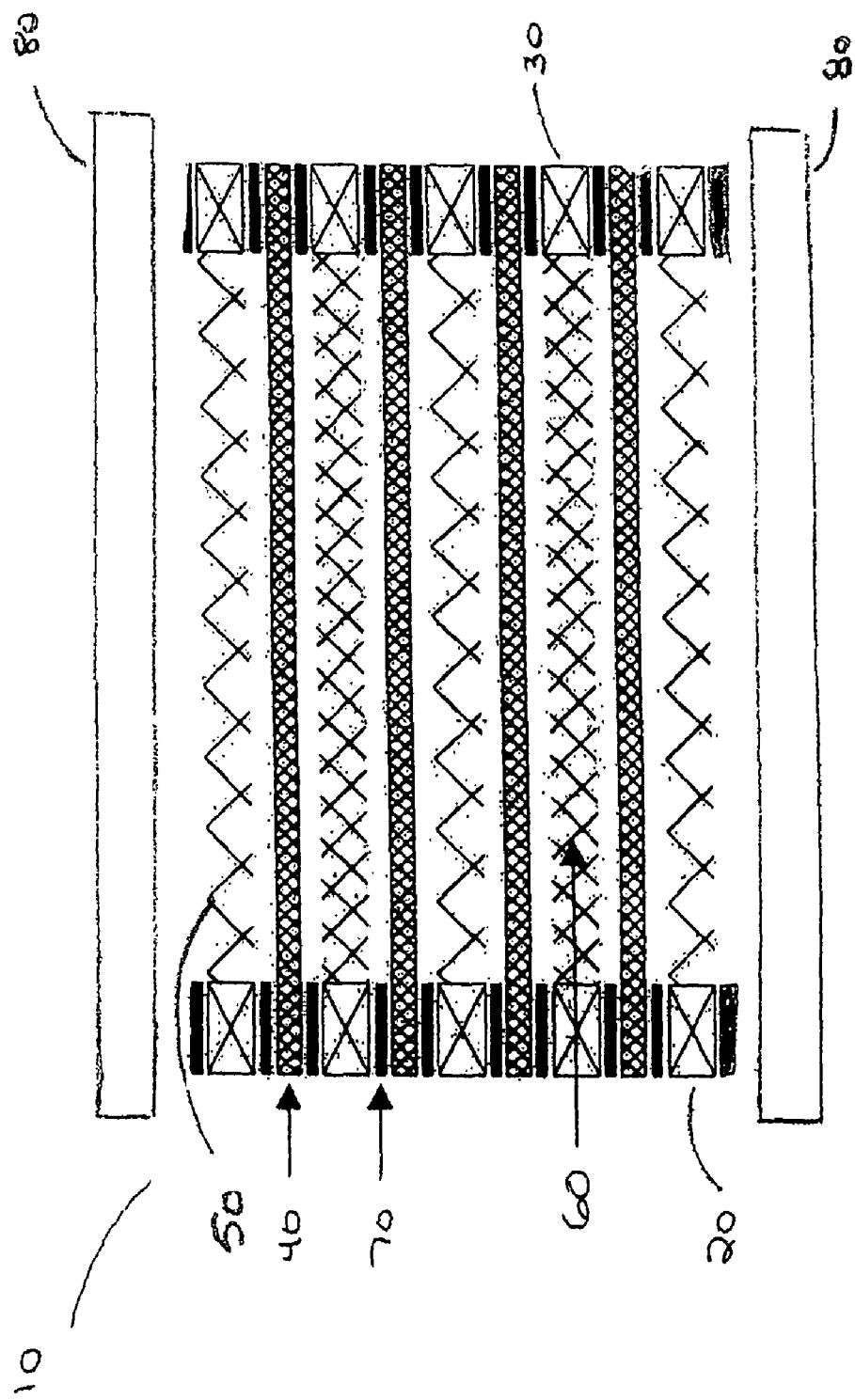
FIG. 1 is a schematic cross-sectional view of a preferred embodiment of the laminated cross-flow filtration cassette of the invention.

A cross-sectional view of a preferred embodiment of a laminated cross-flow filtration cassette of the invention is generally shown in FIG. 1. Filtration cassette 10 includes one or more filtrate channel spacers 20, one or more feed channel spacers 30, and one or more membranes 40. The number of channel spacers and membranes included in a filtration cassette can be influenced by the capacity requirements for the filtration cassette. In general the number of membranes can be twice the number of feed channel spacers. The number of filtrate channel spacers can be equal to the number of feed channel spacers or the number of feed channel spacers plus one. However, a cassette can be constructed with only one membrane, one filtrate channel spacer and one feed channel spacer, or other numbers of membranes and spacers.

The total number of membranes within a cassette can be from 1 to 1000 or more, preferably from 1 to 500, and more preferably from 1 to 250. The total number of feed channel spacers within a cassette can be from 1 to 500 or more, preferably from 1 to 250, and more preferably from 1 to 125. The total number of filtrate channel spacers within a cassette can also be from 1 to 500 or more, preferably from 1 to 250, and more preferably 1 to 125. For example, a small cassette can have 2 membranes, 1 feed channel spacer and 2 filtrate channel spacers. A 1× cassette can have 22 membranes, 11 feed channel spacers and 12 filtrate channel spacers. A 5× cassette can have 110 membranes, 55 feed channel spacers and 56 filtrate channel spacers. A 10× cassette can have 220 membranes, 110 feed channel spacers and 111 filtrate channel spacers. A 20× cassette can have 440 membranes, 220 feed channel spacers and 221 filtrate channel spacers, etc.

Membranes 40 are positioned between feed channel spacers 30 and filtrate channel spacers 20. Filtration cassette 10 also preferably includes one or more filtrate screens 50 inserted into the open interior volume of filtrate channel spacers 20. Filtration cassette 10 can further include one or more feed screens 60, inserted into an open interior volume of feed channel spacers 30. Preferably, each of the open interior volumes of the filtrate channel spacers 20 and the feed channel spacers 30 have one filtrate screen 50 or feed screen 60. The screens 50, 60 can fill the area defined by the membranes 40 and the spacers 20, 30, while still facilitating the flow of feed or filtrate therethrough. The screens may also serve other purposes, such as that of an additional filtration means or preventing compression of the cassette by keeping the channel volume relatively constant. A thin film of adhesive 70 is used to bind the alternating layers of filtrate channel spacers 20, membranes 40, and feed channel spacers 30. Filtration cassette 10 can further include one or more, preferably two, end plates 80.

Thin film of adhesive 70 can be a hot melt adhesive, such as a polymeric adhesive, or PSA, such as a silicone-, acrylic- or synthetic rubber-based PSA. A PSA may be in the form of a transfer tape applied to a polysulfone or polyolefin carrier. The term "pressure-sensitive adhesive" or "PSA" means a bonding agent that remains tacky and ready for use after curing. Other suitable bonding agents that may be used to form the thin film of adhesive include, but are not limited to, one- or two-part adhesives, UV or electron beam curable materials, or other bonding materials capable of being applied as a thin coating. For many applications, the thin film of adhesive can be approximately 0.020 inches (about 500 μm) or less. PSAs with a thickness in the range of approximately 0.002 inches (about 50 μm) to approximately 0.005 inches (about 130 μm) are preferred.

The use of thin films of adhesive in the filtration cassette of the present invention may eliminate or reduce the leaching and extraction problems associated with undesired contaminants in prior single and two-part urethane and silicone systems. The use of a thin film of adhesive may also eliminate the need for the cosmetic edge found on traditional cassettes, and thus may reduce the amount of adhesive used during assembly by as much as seventy-five (75) percent. In addition, the use of thin films of adhesive in the present invention may facilitate more efficient or cost effective manufacturing, at least in part because spacers having thin films of adhesive are more convenient to use than liquid urethane or silicone encapsulation systems. Further, when PSA is used as the thin film of adhesive, the curing time may be reduced or eliminated, and the build cycle may be shortened from two to three days for a traditional cassette to one day for a filtration cassette of the present invention. The use of spacers and thin films of adhesive may also permit taller cassette heights, eliminating the problems associated with varying encapsulant viscosities, and reducing the number of gaskets needed in production.

Figure 2:
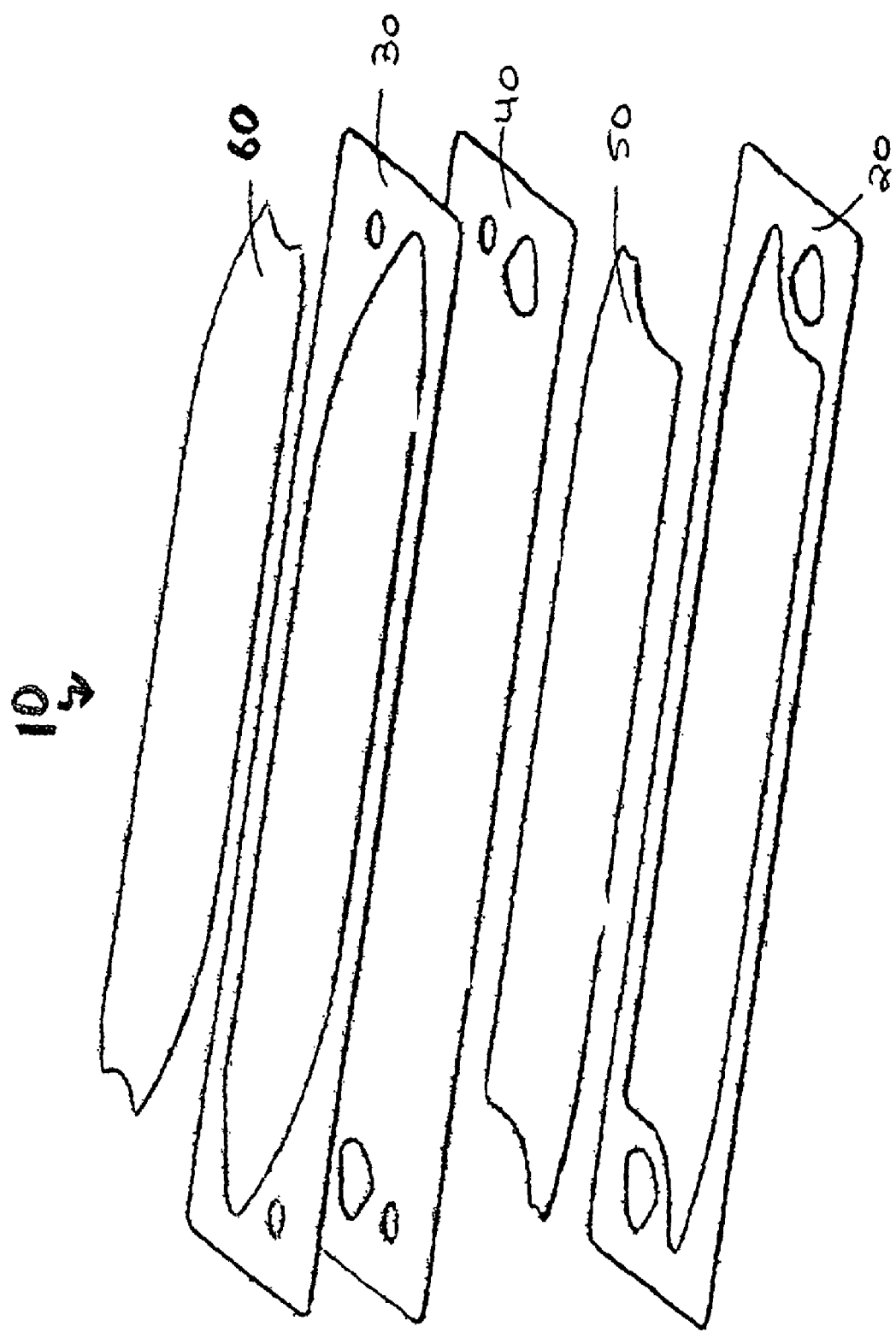
FIG. 2 is an exploded perspective view of components of a laminated cross-flow filtration cassette of FIG. 1.

The components of filtration cassette 10 are further shown in FIG. 2. Filtrate channel spacer 20 and feed channel spacer 30 are preferably made of polypropylene, although any material that can be supplied in sheet or film form and cut to the required size and shape, including but not limited to high density polyethylene (HDPE), low density polyethylene (LDPE), polysulfone, polyketones (PEEK), nylon, and Poly-Vinylidine DiFlouride (PVDF), is contemplated and within the scope of the invention. Channel spacers 20 and 30 are preferably die-cut, although other methods of manufacture that result in uniform shape and tight tolerance, including but not limited to machining, stamping, and molding, are contemplated and within the scope of the invention. As a result, the channels of the laminated cassette of the present invention may be highly defined and may not be subject to the disadvantages resulting from the use of urethane or silicone encapsulation systems. In addition, the use of die-cut spacers may reduce material handling during manufacturing, and facilitate automated or robotic assembly.

Channel height is defined primarily by the thickness of channel spacers 20 and 30, and to a lesser degree by the thickness of thin film of adhesive 70. In general, the formula for determining the channel height is, $C=S+2A$, where C is the channel height, S is the thickness of channel spacer 20 or 30, and A is the thickness of thin film of adhesive 70. Channel height is preferably in the range of approximately 0.010 inches (about 0.25 mm) through approximately 0.10 inches (about 2.5 mm), although in other embodiments, channel heights can be as small as approximately 0.004 inches (about 0.1 mm) or as large as approximately 12 inches (about 30 cm). By adjusting the thickness of channel spacers 20 and 30, channel height may be selectively defined to within very tight tolerances.

In an alternative embodiment, channel height can be adjustable through the use of flexible or resilient materials as channel spacers. The preferred flexible or resilient material is closed cell foam, although other flexible or resilient materials are contemplated and within the scope of the invention. Closed cell foams are typically used for sealing gaps. The foam can expand and contract to maintain contact between two surfaces, thus facilitating a seal between the two surfaces. Channel height could be adjusted during operation by increasing or decreasing the compressive forces on filtration cassette 10. When the compressive force is increased, the closed cell foam contracts, thus reducing the channel height. When the compressive force is decreased, the channel height is increased, and the closed cell foam expands to maintain the tight liquid seal. Since channel height directly affects fluid velocity at the membrane surface, and thereby flux, the adjustable channel height would allow the user to monitor the process performance and adjust the channel height accordingly. For example, in a dewatering application, the channel height could be adjusted to compensate for the increasing fluid viscosity over time. By using the adjustable channel spacer, the user would not have to stop the process or replace the filter unit to accommodate the change in the fluid.

With further reference to FIGS. 1 and 2, filtrate screen 50 and feed screen 60 are preferably made of woven polypropylene, although other woven or extruded meshes made of polyester, polyamide, nylon, polyetheretherketone (PEEK), and Teflon-based materials such as ethylene tetrafluoroethylene (ETFE), or blends of any of these materials, are contemplated and within the scope of the invention. Screens 50 and 60 are preferably die-cut, although other methods of manufacture, including machining, stamping, or molding, are contemplated and within the scope of the invention. In addition, the use of die-cut screens may reduce material handling during manufacturing, and facilitate automated or robotic assembly. Filtrate screen 50 and feed screen 60 are preferably inserted into an open interior volume of filtrate channel spacer 20 and feed channel spacer 30, respectively. Screens 50 and 60 can create turbulence, which minimizes gel layer formation while improving fluid velocity at the membrane surface. A build up of the gel layer may cause the membrane to foul, resulting in reduced membrane flux. Filtrate screen 50 can also provide support for membrane 40 and act as an under drain to facilitate the flow of fluid out of filtration cassette 10.

If feed screen 60 is not used, the feed channel is left open and flowing. Without a screen, however, a higher pumping capacity may be required to achieve the same fluid velocity at the membrane surface as would be achieved with a screen for the same channel height. In general, screens 50 and 60 act as a turbulence promoter to minimize fouling while reducing the total fluid volume passing through a channel. A lesser flow, in turn, requires less pumping. In general, low viscosity fluids are better suited to channels with a relatively low channel height and screens, while high viscosity fluids are better suited to channels with a relatively high channel height with no screens or more open screens.

Preferably, screens 50 and 60 are sized to "float" in the channel. In other words, screens 50 and 60 are preferably sized such that their thickness does not exceed the total channel height created by the combination of channel spacer 20 or 30 and thin film of adhesive 70. A "floating" screen does not impinge on membrane 40, and may result in less debris build-up under the screen.

Alternatively, screens 50 and 60 and channel spacers 20 and 30 can be sized such that the screen thickness is greater than the channel height, such that the screen is pressed into the membrane to mimic traditional cassette technology. In other embodiments, screens or turbulence promoters (not shown) may be molded into channel spacers 20 and 30.

With further reference to FIGS. 1 and 2, membrane 40 includes ports for feed, retentate and filtrate, although different numbers and configurations of ports, including but not limited to having only one filtrate port, or having multiple feed and retentate ports, are contemplated and within the scope of the invention. Membrane 40 is preferably made of modified polyethersulfone or regenerated cellulose, although any semi-permeable sheet material, including but not limited to ultrafiltration, microporous, nanofiltration or reverse osmosis filters formed from polyvinylidene fluoride (PVDF), polysulfone, polyethersulfone, regenerated cellulose, polyamide, polypropylene, polyethylene, polytetrafluoroethylene, cellulose acetate, polyacrylonitrile, vinyl copolymer, polycarbonate, and blends of these materials, are contemplated and within the scope of the invention. Membranes 40 are preferably die-cut, although other methods of manufacture, including machining, stamping, or molding, are contemplated and within the scope of the invention. In addition, the use of die-cut membranes may reduce material handling during manufacturing, and facilitate automated or robotic assembly. The membrane pore size rating is preferably in the range of approximately 1,000 Dalton through approximately 1 micron, although in other embodiments, pore size ratings may be from less than approximately 100 Dalton to approximately 3 micron.

It should be noted that in an alternative embodiment, (not shown) the membranes may be made of a non-permeable material, such that there is no fluid flow through the membrane. In this manner, the filtration cassette of the present invention may be used as a heat exchanger, to transfer heat between a fluid flow in the feed channel and a fluid flow in the filtrate channel.

Figure 3:
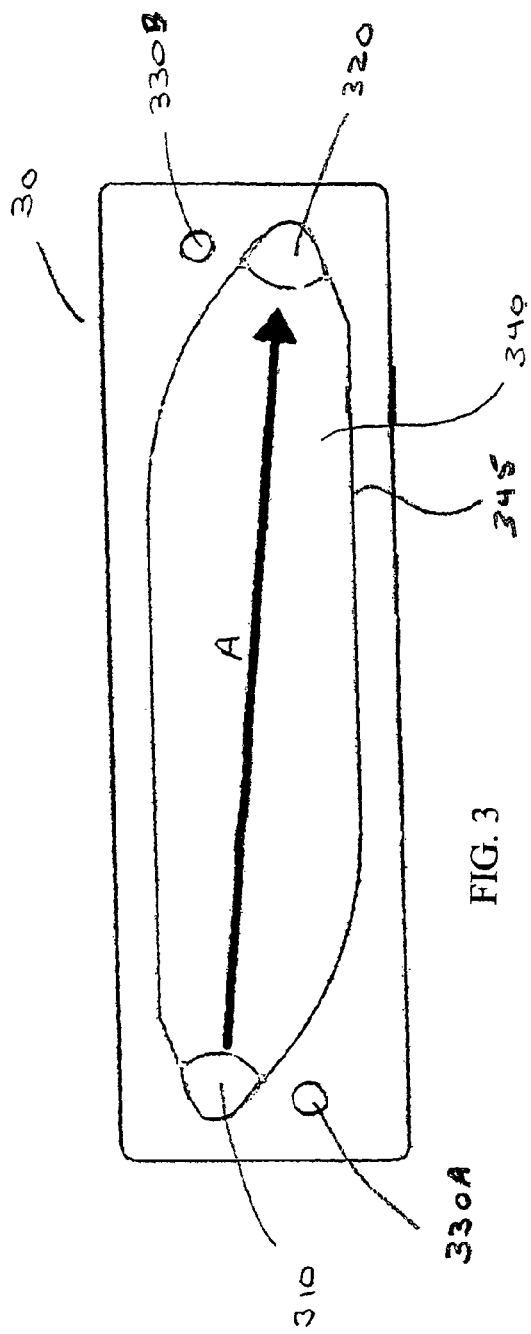
FIG. 3 is a more detailed schematic view of a feed channel spacer of the laminated cross-flow filtration cassette of FIG. 1.
Figure 6A:
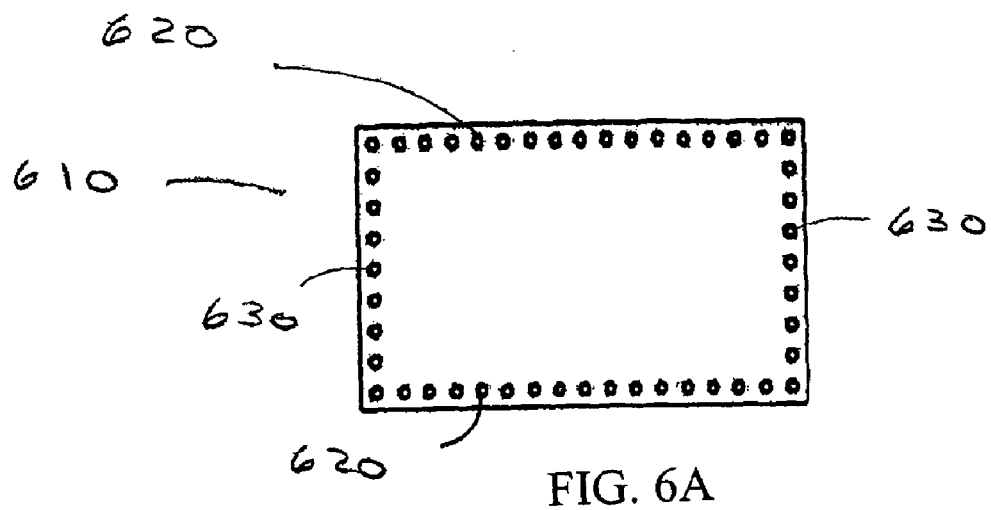
FIGS. 6A, 6B and 6C are views of industry standard port configurations that can be used with the laminated cross-flow filtration cassette of the invention.
Figure 6B:
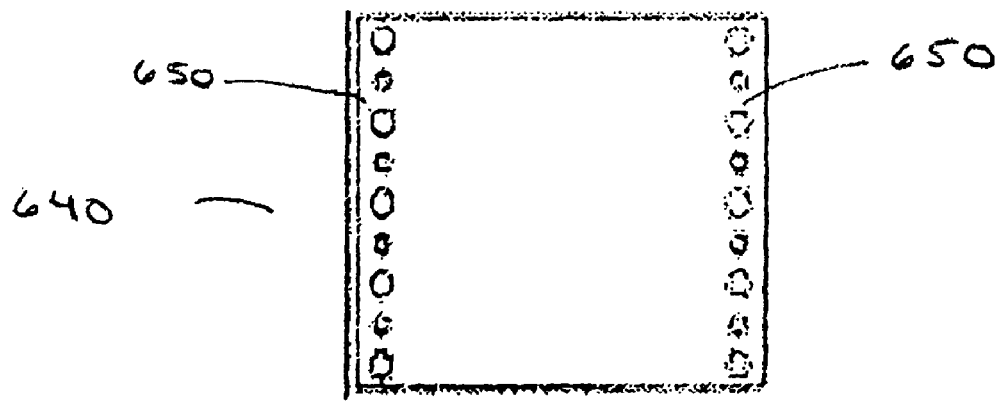
Figure 6C:
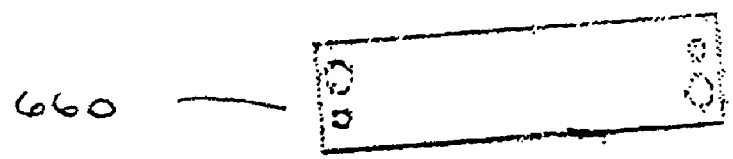

Referring to FIG. 3, and with further reference to FIGS. 1 and 2, feed channel spacer 30 preferably includes a feed port 310, a retentate port 320, and two filtrate ports 330. However, different numbers and configurations of ports, including but not limited to having only one filtrate port, or having multiple feed/retentate and filtrate ports, are contemplated and within the scope of the invention. The number of feed ports, retentate ports and filtrate ports can be established in accordance with known industry configurations, for example as shown in FIGS. 6A-6C. Alternatively, the number of ports of each type can be customized. The number of each of the feed ports, filtrate ports and retentate ports in the cassette can be from 1 to 100 or more, preferably from 1 to 50, and more preferably 1 to 15. In the configuration of FIG. 6A, the cassette can include 15 feed ports, 14 filtrate ports and 15 retentate ports. (The configuration of FIG. 6A includes four non-flowing ports, which are located at each corner of the cassette and can be used to align the cassette in a holder or other apparatus in which the cassette will be used.) In the configuration of FIG. 6B, the cassette can include 5 feed ports, 8 filtrate ports and 5 retentate ports. In the configuration of FIG. 6C, the cassette can include 1 feed port, 2 filtrate ports and 1 retentate port.

Feed channel 340 is preferably an open channel, and is defined by inner perimeter 345. In another embodiment, feed screen 60 can be inserted into an open interior volume of feed channel 340. The flow of fluid through feed channel 340 is shown by arrow "A." Fluid enters as feed via feed port 310. Particles in the feed that are smaller than the pore size of membrane 40 pass through membrane 40 and into the filtrate channel below. Particles in the feed that are larger than the pore size of membrane 40 do not pass through membrane 40 but are retained in the fluid and exit as retentate via retentate port 320.

Figure 4:
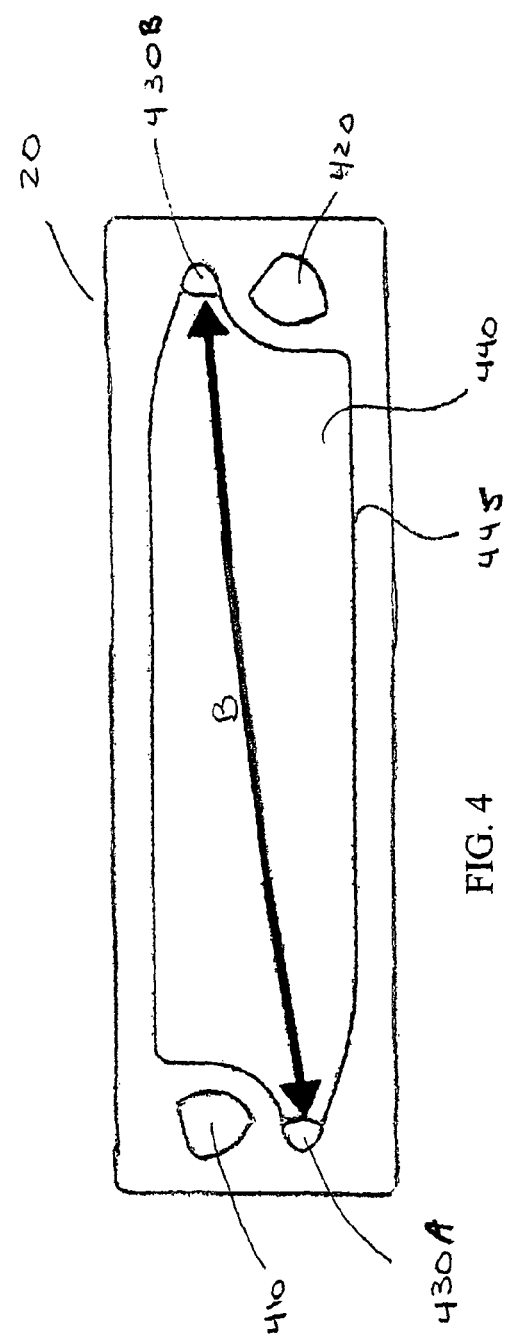
FIG. 4 is a more detailed schematic view of a filtrate channel spacer of the laminated cross-flow filtration cassette of FIG. 1.

Referring to FIG. 4, and with further reference to FIGS. 1 and 2, filtrate channel spacer 20 preferably includes a feed port 410, a retentate port 420, and two filtrate ports 430. However, like the feed ports 330, different numbers and configurations of ports, including but not limited to having only one filtrate port, or having multiple feed/retentate and filtrate ports, are contemplated and within the scope of the invention. Filtrate screen 50 is inserted into an open interior volume of filtrate channel 440. Filtrate channel 440 is defined by inner perimeter 445. The flow of fluid in filtrate channel 440 is shown by arrow "B." Filtrate containing particles that are smaller than the pore size of membrane 40 enters through the membrane and exits via filtrate ports 430.

With further reference to FIGS. 1-4, filtration cassette 10 is preferably fabricated by alternating membranes 40 with channel spacers 20 and 30. Preferably, filtrate channel spacers 20 are alternated with feed channel spacers 30 as shown in FIG. 1. Channel spacers 20 and 30 and membranes 40 are positioned such that the feed ports, filtrate ports, and retentate ports are in respective alignment. As used herein with respect to ports, the term "respective alignment" means that the individual ports of distinct filtrate channel spacers 20 and feed channel spacers 30 are in fluid communication with the same type ports of the other filtrate channel spacers 20 and feed channel spacers 30 in the stack. Preferably, the ports are aligned by consistently positioning the ports of each spacer with the same type ports of the other spacers in the stack. For example, if each spacer in the stack includes a first filtrate port 330A, 430A in the lower left corner, as shown in FIGS. 3 and 4, the first filtrate ports 330A, 430A of all of the spacers will be aligned. Similarly, and by way of further example and as shown in FIGS. 3 and 4, the second filtrate ports 330B, 430B (in the upper right corner) of each spacer are aligned, the feed ports 310, 410 (in the upper left corner) of each spacer are aligned, and the retentate ports 320, 420 (in the lower right corner) of each spacer are aligned. When one or more sets of aligned ports of the same type, such as the first 330A, 430A and second 330B, 430B filtrate ports, are present, these sets of ports need not participate in two-way fluid communication with each other, but can each be in fluid communication with one or more common sources, such as, in the case of filtrate ports 330, 430, filtrate channel 440 or multiple filtrate channels.

With further reference to FIGS. 1-4, inner perimeter 345 of feed channel spacer 30 defines the fluid flow through feed channel 340, and inner perimeter 445 of filtrate channel spacer 20 defines the fluid flow through filtrate channel 440. Inner perimeters 345 and 445 can be defined to create swept curves in the flow paths and thus may prevent or eliminate non-uniformities in the flows and the formation of no-flow zones. As previously described, no-flow zones are typically formed in prior art filtration cassettes that use liquid glues. FIGS. 5A and 5B depict the formation of no-flow zones in prior art cassettes.

FIG. 5A depicts a typical filtrate layer 500 of a prior art filtration cassette. Filtrate layer 500 includes feed/retentate ports 510 and filtrate ports 520. FIG. 5B depicts a typical feed layer 550 of a prior art filtration cassette. Feed layer 550 includes feed/retentate ports 560 and filtrate ports 570. As described above, liquid urethane or silicone systems are commonly used in prior art filtration cassettes to encapsulate the layers of the filtration cassette and to seal unused ports. As shown in FIG. 5A, once-cured, the encapsulant 540 forms a perimeter around filtrate layer 500, which seals feed/retentate ports 510 and creates filtrate flow channel 545 defined by inner perimeter 542. Because the flow of liquid encapsulant is difficult to control, the resulting inner perimeter 542 and filtrate flow channel 545 are typically non-uniform. This non-uniformity typically results in no-flow zones or "dead-spots" 530. As shown in FIG. 5A, filtrate flow, represented by arrow "A," typically becomes trapped in no-flow zones 530. (Although the perimeter 542 is shown smooth in FIG. 5A for clarity, it should be understood that the inner perimeter 542 of conventional filtrate flow channels 545 may not be smooth.)

Similarly, as shown in FIG. 5B, the cured encapsulant 590 forms a perimeter around feed layer 550, which seals filtrate ports 570 and creates feed flow channel 595 defined by inner perimeter 592. As with filtrate flow layer 500, feed flow inner perimeter 592 and feed flow channel 595 are typically non-uniform, and this non-uniformity typically results in no-flow zones 580. As shown in FIG. 5B, feed flow, represented by Arrow "B," typically becomes trapped in no-flow zones 580.

In contrast, as shown in FIGS. 3 and 4, flow channels 340 and 440 of the present invention are defined by inner perimeters 345 and 445 of the spacers 20, 30, respectively, rather than by encapsulants that have been applied as a liquid and cured in place to form non-uniform walls. The resulting flow channels 340 and 440, therefore, may be selectively designed in any number of patterns, and thus may reduce or eliminate non-uniformities in the flow and no-flow zones.

With further reference to FIG. 1, filtration cassette 10 is preferably fixed between end plates 80. End plates 80 include openings (not shown) for feed, retentate and filtrate ports. End plates 80 are preferably made of polypropylene, although other materials, including but not limited to high density polyethylene (HDPE), low density polyethylene (LDPE), polysulfone, polyketones (PEEK), nylon, and PolyVinylidine DiFlouride (PVDF) and metal alloys are contemplated and within the scope of the invention. In operation, filtration cassette 10 and end plates 80 are preferably compressed together by a clamping mechanism (not shown). The end plates 80 can be bound to each other by side plates or other retaining means, serving to retain the cassette 10 therein. This retention force may also be calculated to apply a predetermined amount of pressure to the cassette 10.

Referring to FIG. 6, the filtration cassette of the present invention can be manufactured to conform to industry standards, including but not limited to industry standard formats "A," "B," and "C." As shown in FIG. 5, the filtration cassette of format "A" 610 is preferably configured with a row of feed/retentate ports 620 along the top and bottom edges of the filtration cassette and a row of filtrate ports 630 along the side edges of the filtration cassette. The filtration cassette of format "B" 640 preferably includes alternating feed/retentate and filtrate ports 650 along each of the side edges of the filtration cassette. The filtration cassette of format "C" 660 is the format of the preferred embodiment of the invention, and includes one feed/retentate port and one filtrate port on each of the side edges of the filtration cassette. The filtration cassette of the present invention is not limited to these industry-standard formats, and other configurations of feed/retentate and filtrate ports are contemplated and within the scope of the invention.

Self-Contained Cross-Flow Filtration Assemblies

Figure 7:
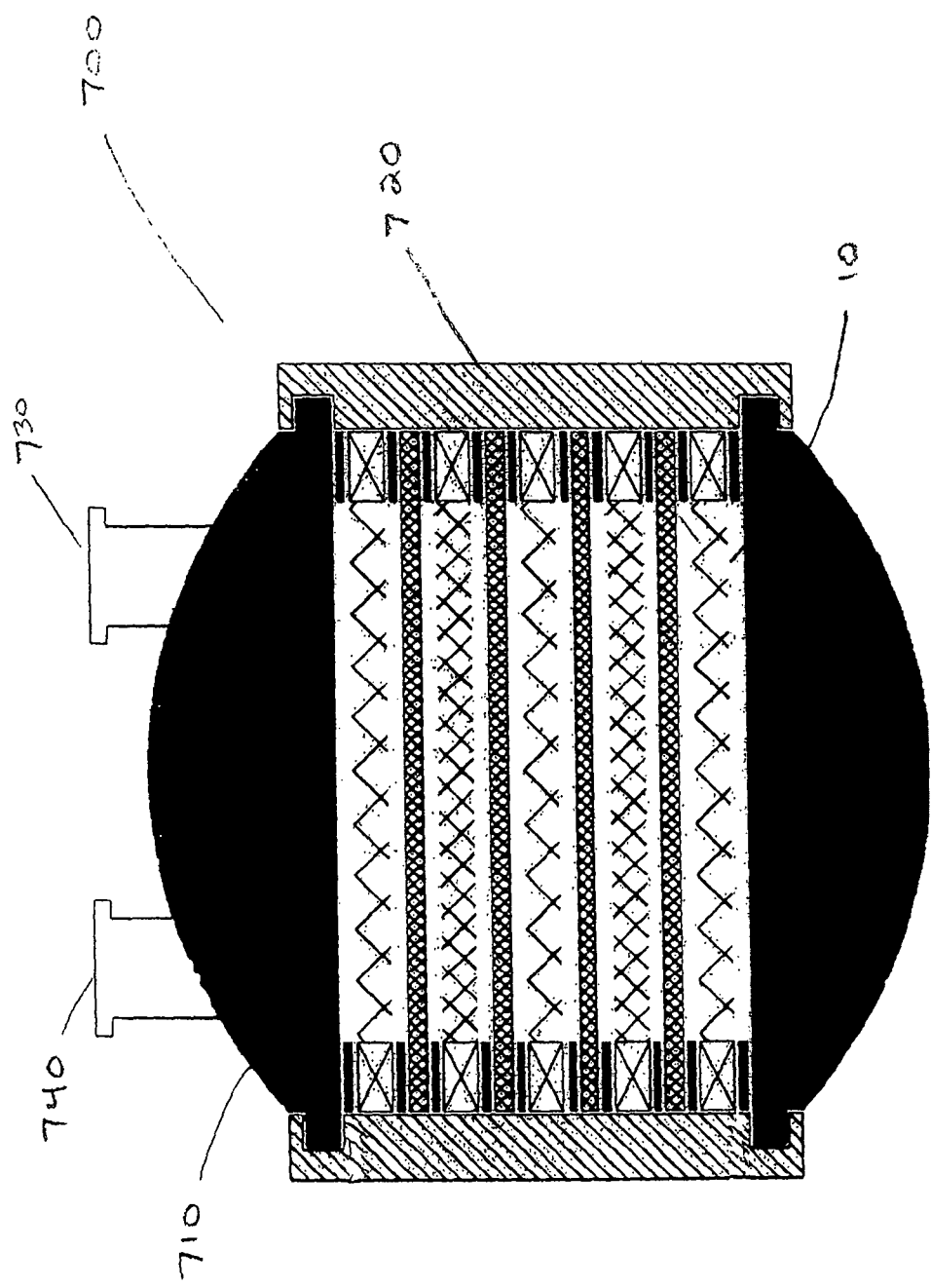
FIG. 7 is a schematic cross-sectional view of a preferred embodiment of a self-contained cross-flow filtration assembly of the invention.

The present invention also relates to a self-contained cross-flow filtration assembly. A cross-sectional view of a preferred embodiment of the self-contained cross-flow filtration assembly of the present invention is shown in FIG. 7. Filtration cassette 10 can be fixed between a pressure-retaining molded shell 710 and sealed with an edge binder 720 to form a self-contained filtration assembly 700. Molded shell 710 is preferably made of polypropylene, although other moldable plastic materials are contemplated and within the scope of the invention, including but not limited to high density polyethylene (HDPE), low density polyethylene (LDPE), polysulfone, polyketones (PEEK), nylon, and PolyVinylidine DiFlouride (PVDF). Molded shell 710 preferably includes a fluid inlet manifold 740 and a fluid outlet manifold 730, although other embodiments may include additional manifolds. Edge binder 720 is preferably made of polypropylene, although polysulfone and other polyolefin materials are contemplated and within the scope of the invention. Self-contained filtration assembly 700 may eliminate the need for external endplates and compression mechanisms.

Methods of Manufacture

The invention also relates to a method of fabricating a filtration cassette. The cassettes described herein can be manufactured by die cutting membranes, filtrate channel spacers and feed channel spacers into appropriate shapes, such as those shown in FIGS. 2 and 3, from sheets or films of the suitable materials described above. Alternatively, the membranes, filtrate channel spacers or feed channel spacers can be produced by machining, stamping, molding, or any other method suitable for the selected material. As noted above, each of the filtrate channel spacers or feed channel spacers should be formed with at least one feed port, at least one retentate port and at least one filtrate port.

A thin film of adhesive, such as hot melt adhesive or PSA, can be applied to a feed channel spacer and a filtrate channel spacer. When a tape, such as a PSA tape, is used, it can be applied prior to die cutting of the spacers, or cut separately and applied to the spacers after they are formed. If hot melt or another adhesive is used, the adhesive can be applied to the spacer prior to assembly, or can be pattern applied to the adjacent membrane in registration with the shape of the spacers prior to assembly.

A membrane can then be disposed between the feed channel spacer and the filtrate channel spacer, with the thin film of adhesive of each spacer oriented toward the membrane. When so disposing the membrane between the feed channel spacer and the filtrate channel spacer, the feed ports and the filtrate ports of the feed channel spacer and the filtrate channel spacer can be placed in respective alignment to allow fluid communication between each set of ports. While the ports are aligned, the membrane can be bound to the feed channel spacer and the filtrate channel spacer with the thin film of adhesive.

The combined membrane, feed channel spacer and filtrate channel spacer can be capped at each major side with an end plate, the end plates connected by side plates or another end cap retainer, and the unit can be used as a cassette. Alternatively, an additional thin film of adhesive can be applied to the exposed major side of the filtrate channel spacer and a second membrane may be adhered thereto. A second feed channel spacer, third membrane, and second filtrate channel spacer, in order and with their respective ports in relative alignment, can also be added with a thin coating of adhesive between each. In another alternative, a thin film of adhesive can be applied to the exposed side of the feed channel spacer, followed by a second membrane. A second filtrate channel spacer, third membrane and feed channel spacer, in order and with their respective ports in relative alignment, can also be added with a thin coating of adhesive between each. Additional layers of feed channel spacers, membranes, and filtrate channel spacers can be added as desired prior to installation of end caps and end cap retainers. Of course, rather than using end caps and retainers, the stack of membranes and spacers can be retained within a housing.

In a preferred manufacturing method, a thin film of adhesive can be applied to each side of a filtrate channel spacer. A membrane can then be disposed on each side of the filtrate channel spacer and bound by the thin film of adhesive. The combined membranes and filtrate channel spacer will be referred to herein as a membrane unit. Two membrane units can be combined by applying thin layers of adhesive to each side of a feed channel spacer, positioning the spacers such that their feed, retentate and filtrate ports are in respective alignment, and adhering a membrane unit to each side of the feed channel with the thin films of adhesive. Multiple membrane units can be added in similar fashion to achieve a stack having the desired number of membranes.

The manufacturing process can be facilitated by employing an assembly station (not shown) having posts that extend upwardly from a base. The posts can be positioned to correspond with the positions of, for example, the feed and retentate ports of the spacers. During assembly, the membrane units (or individual units thereof) and feed channel spacers can be engaged with the posts and conveniently slid onto the next layer in relative alignment. As shown in FIGS. 3 and 4, the feed and retentate ports can be of a larger size than the filtrate ports. Therefore, the posts of the assembly station can be sized to accept feed and retentate ports, but be sized too large to accept filtrate ports, to help ensure that the spacers are consistently assembled in relative alignment.

Cassette Holder and System for Laminated Cross-Flow Filtration Cassettes

Figure 10:
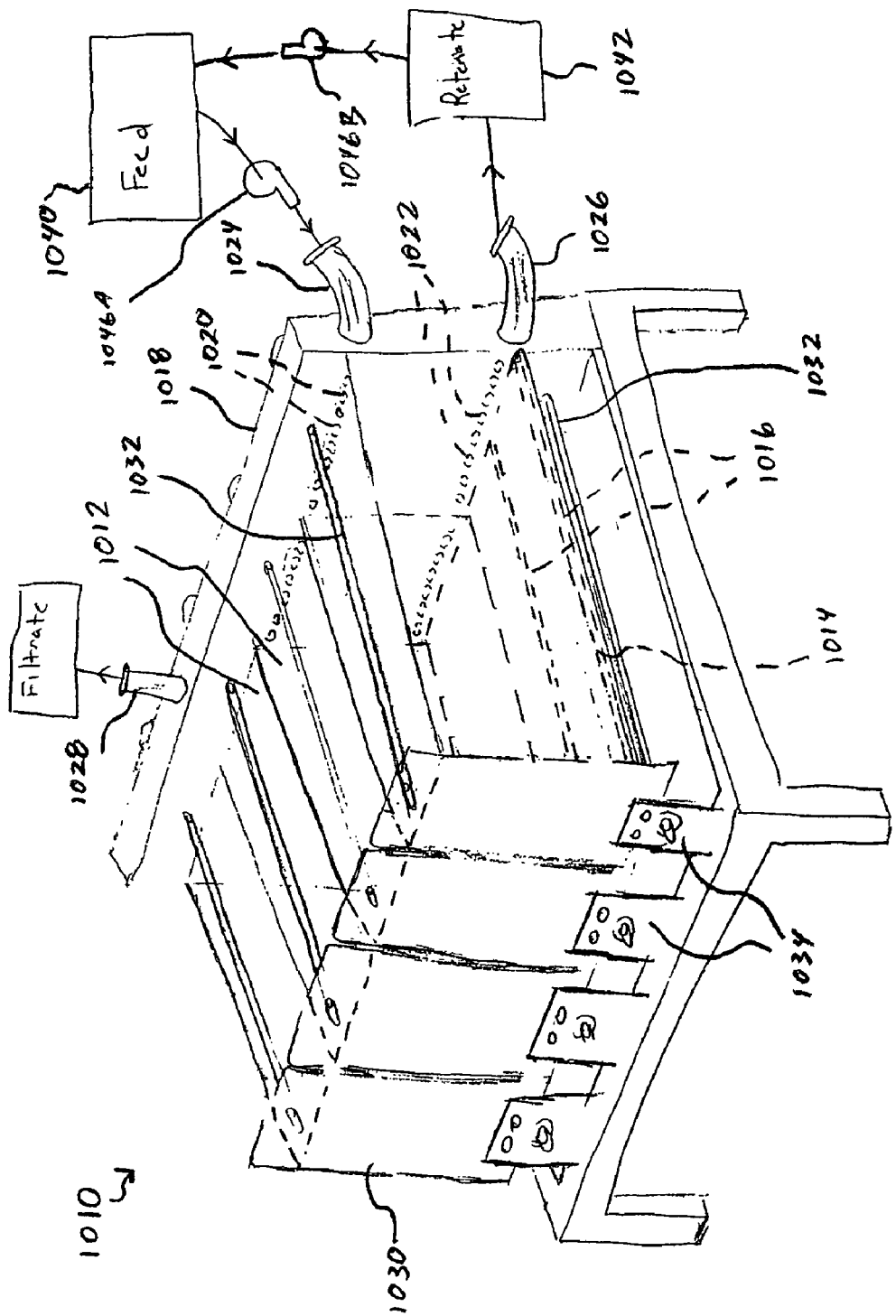
FIG. 10 is a perspective view of a cassette holder, in combination with a schematic view of a filtration system useful therewith.

The cross-flow filtration cassette embodiment of the invention can be used in combination with a cassette holder 1010, shown in FIG. 10, or other apparatus. When used with a cassette holder 1010, 1 to 50 or more cassettes 1012 can be placed in the holder, depending on its capacity. A suitable cassette holder can include a receiving station 1014 with cassette supports 1016 to receive one or more cassettes. The cassette holder can further include a manifold 1018 with fluid flow outlets 1020 at each receiving station. The fluid flow outlets 1020 can be positioned to correspond with the feed ports of the cassettes to be received. The manifold can further include inlets 1022 at each receiving station corresponding to the filtrate and retentate ports of the cassettes to be received. The manifold inlets and outlets, in turn, can be in fluid communication with a manifold inlet 1024 by which the manifold can receive feed, and manifold outlets 1026, 1028 through which the manifold can expel retentate and filtrate, respectively.

The cassette holder can include a clamping plate 1030 at the end of each receiving station opposite the manifold 1018. Preferably, each receiving station is provided with an individual clamping plate 1030, although it is possible to provide a universal clamping plate for all receiving stations. Each receiving station of the cassette holder can further include traveling arms 1032 extending from the manifold along which the clamping plate can travel. An actuator 1034 can be coupled to each clamping plate 1030 in order to move the clamping plate along the traveling arms toward or away from the manifold.

In use, one or more cassettes can be placed in each respective receiving station of the cassette holder. When small cassettes are used, it is possible to stack multiple cassettes end-to-end within a single receiving station, with a gasket between each cassette. When stacking multiple cassettes in a single receiving station, the individual feed ports, retentate ports and filtrate ports of each cassette in the stack should be aligned. It is also possible to use only one cassette per receiving station. Once the desired number of cassettes are in place in the receiving stations, the clamping plates can be actuated toward the manifold along the traveling arms to engage the cassette between the clamping plate and the manifold, and seal the cassette feed ports, retentate ports and filtrate ports in fluid communication with the respective inlets and outlets of the manifold. The clamping plates associated with any receiving stations that have not received cassettes can travel to the end of the traveling arms to engage the manifold and seal the outlets and inlets of the empty receiving stations.

In alternative embodiments, the manifold can include only outlets for supplying feed to the cassettes. In such embodiments, the clamping plate or plates can include inlets for receiving the retentate and filtrate from the cassettes, and outlets for discharging the retentate and filtrate. In another alternative embodiment, the manifold can include only inlets for receiving the retentate and filtrate from the cassettes, and outlets for discharging the retentate and filtrate. In that embodiment, the clamping plate or plates can include outlets for supplying feed to the cassettes. In yet other embodiments, the inlets for receiving the retentate and filtrate from the cassettes and outlets for discharging same can be segregated onto the manifold and clamping plate or plates.

The invention further relates to a system in which the cassettes described herein can be used. Referring again to FIG. 10, the system can include a cassette holder 1010, one or more cassettes 1012, a batch tank 1040 having a reservoir of feed to be filtered, a retentate tank 1042 and a filtrate tank 1044. The system can further include a pump 1046A for driving feed from the batch tank 1040 through the cassette holder, and for driving the resultant retentate and filtrate to the retentate tank 1042 and filtrate tank 1044, respectively. Suitable piping can be used to connect the cassette holder 1010 with the batch tank 1040, retentate tank 1042 and filtrate tank 1044. An additional pump 1046B and piping can be used to drive retentate from the retentate tank 1042 back to the batch tank 1040 for additional filtration. In a preferred embodiment of the system, the retentate can be delivered from the manifold outlet 1026 directly back to the batch tank 1040 for additional filtration, in which case retentate tank 1042 and pump 1046B can be omitted. Of course, other tanks and pumps can be employed to further enhance the filtration process. Those skilled in the art will appreciate further modifications that can be made to the system as shown and described.

Laminated Direct-Flow Filtration (DFF) Capsules

The present invention also relates to a laminated direct-flow filtration (DFF) capsule that utilizes channel spacers coated with a thin film of adhesive, such as hot melt or PSA tape to bond and encapsulate the alternating layers of membranes and channel spacers. As in the embodiments described above, the distinct channel spacer in combination with the thin film of adhesive can provide numerous advantages over systems in which only polyurethane or silicone is used between membranes.

A filtration capsule assembly of the present invention may be used in a variety of small and large-scale applications requiring direct-flow filtration, such as life sciences applications in which the embodiment is particularly suitable for removal of viruses, bacteria, colloids, particulate, foreign matter, aggregated proteins, or other components from the fluid stream. Such filtration can be performed, for example, prior to formulation, downstream purification or long term storage, as well as before final packaging of drug products or other substances.

Figure 8:
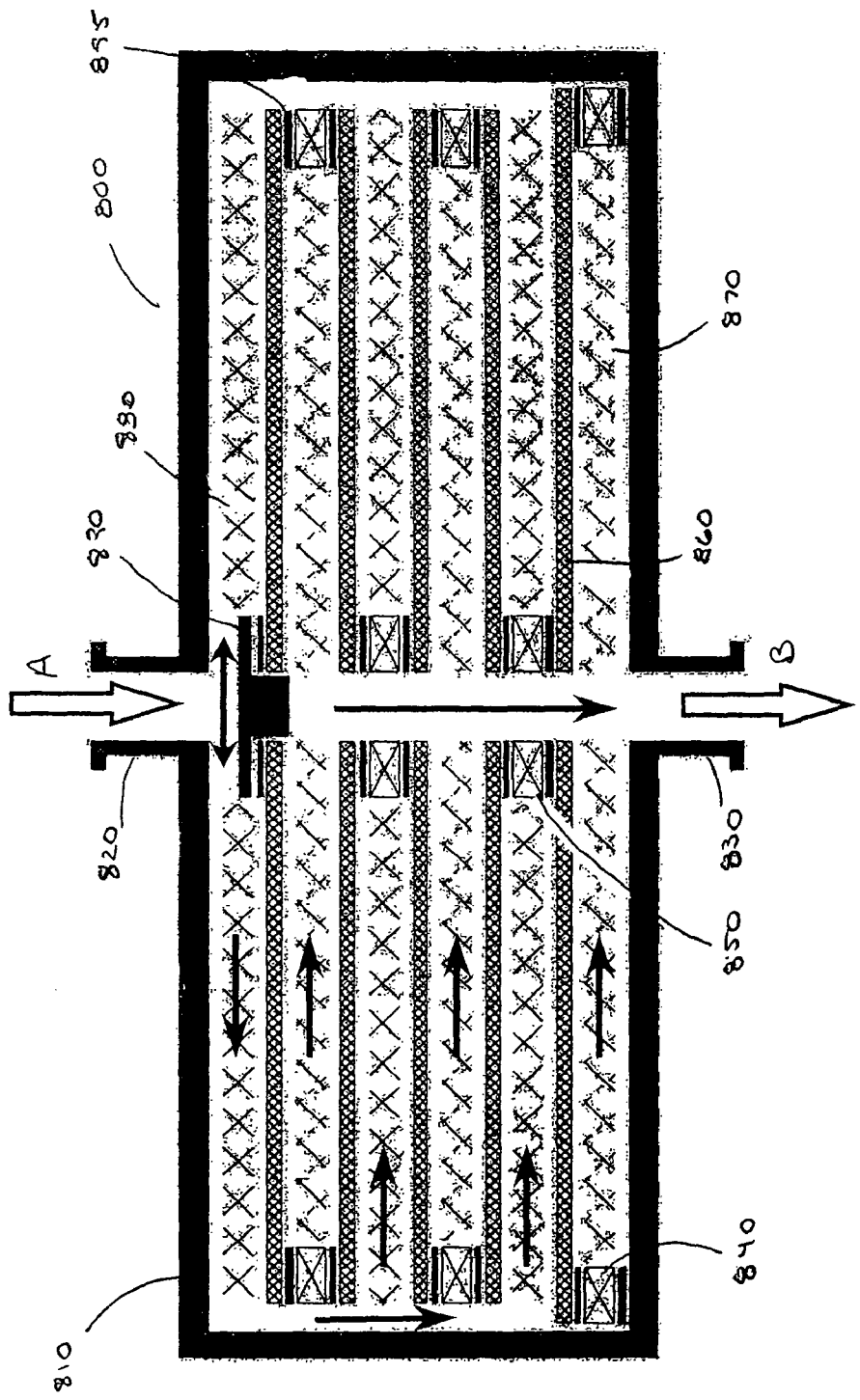
FIG. 8 is a schematic cross-sectional view of a preferred embodiment of a laminated direct-flow filtration capsule of the invention.

A cross-sectional view of a preferred embodiment of a direct-flow filtration capsule of the present invention is shown in FIG. 8. Direct-flow filtration capsule 800 includes a housing 810 with a fluid inlet manifold 820 and a fluid outlet manifold 830, although multiple fluid inlet and outlet manifolds are contemplated and within the scope of the invention. Housing 810 is preferably molded and made of polypropylene, although other moldable plastic materials are contemplated and within the scope of the invention, including but not limited to high density polyethylene (HDPE), low density polyethylene (LDPE), polysulfone, polyketones (PEEK), nylon, and PolyVinylidine DiFlouride (PVDF). In alternative embodiments, housing 810 may be machined and made of metal, preferably stainless steel, although other metallic materials, including but not limited to aluminum, copper, and alloys, are contemplated and within the scope of the invention. Filtration capsule 800 further includes one or more filtrate channel spacers 840, one or more feed channel spacers 850, and one or more membranes 860. The number of channel spacers 840 and 850 and membranes 860 included in a filtration capsule is dependent upon the capacity requirements of the filtration capsule.

With further reference to FIG. 8, membranes 860 are positioned between feed channel spacers 850 and filtrate channel spacers 840. Filtration capsule 800 also includes one or more filtrate screens 870 and one or more feed screens 880. A thin film of adhesive 895 is used to bind the alternating layers of filtrate channel spacers 840, feed channel spacers 850, and membranes 860.

In operation, feed enters fluid inlet manifold 820 as indicated by arrow "A" and is diverted by plug 890 to flow towards membrane 860. Particles in the feed that are too large to pass through the pores of membrane 860 accumulate at the surface of membrane 860, while smaller particles in the feed pass through membrane 860 and out of filtration capsule 800 through fluid outlet manifold 830 as indicated by arrow "B."

With further reference to FIG. 8, thin film of adhesive 895 is preferably a hot melt or PSA in the form of a transfer tape as described above for filtration cassette 10. Other suitable adhesives, as described above for filtration cassette 10, are contemplated and within the scope of the invention. Filtrate channel spacers 840 and feed channel spacers 850 are preferably made of polypropylene, although other materials, as described above for filtration cassette 10, are contemplated and within the scope of the invention. Channel spacers 840 and 850 are preferably die-cut, although other methods of fabrication, as described above for filtration cassette 10, are contemplated and within the scope of the invention.

As with filtration cassette 10, the channel height of filtration capsule 800 is defined primarily by the thickness of channel spacers 840 and 850, and to a lesser degree by the thickness of thin film of adhesive 895. Channel height is preferably in the range of approximately 0.010 inches (about 0.25 mm) through approximately 0.10 inches (about 2.5 mm), although in other embodiments, channel heights can be as small as approximately 0.004 inches (about 0.1 mm) or as large as approximately 12 inches (about 30 cm). By adjusting the thickness of the channel spacers 840 and 850, channel height may be selectively defined to within very tight tolerances.

Figure 9B:
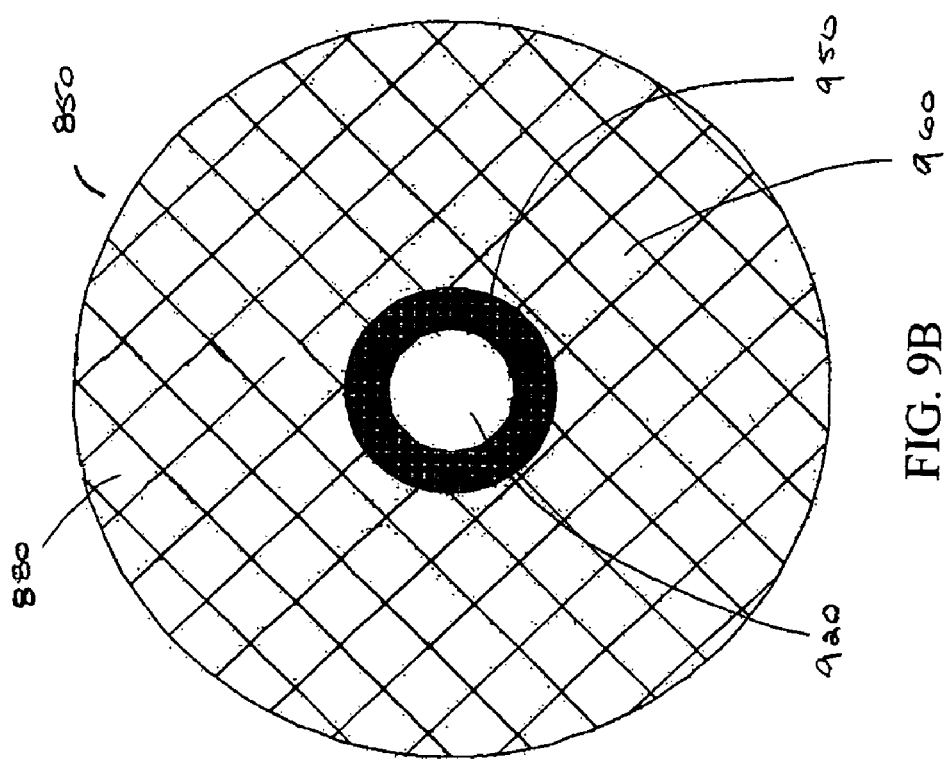
FIGS. 9A and 9B are more detailed schematic views of a filtrate channel spacer and a feed channel spacer, respectively, of the laminated direct-flow filtration capsule of FIG. 8.
Figure 9A:
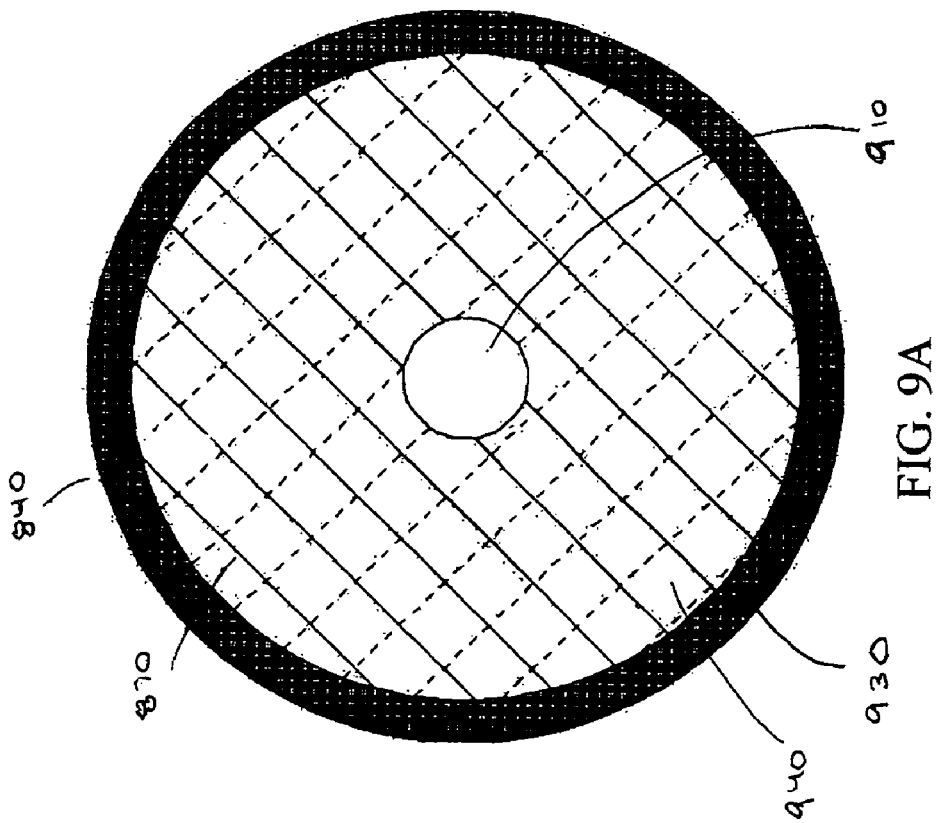

Referring to FIG. 9A, and with further reference to FIG. 8, filtrate channel spacer 840 preferably includes a centered filtrate port 910. Alternate embodiments may include additional filtrate ports and/or different locations for the filtrate ports. Thin film of adhesive 895 is used to seal the outer perimeter 930 on filtrate channel spacer 840 and thus create an open interior volume 940. Filtrate screens 870 are inserted into open interior volume 940 of filtrate channel spacers 840.

Referring to FIG. 9B, and with further reference to FIG. 8, feed channel spacer 850 preferably includes a centered filtrate port 920. Alternate embodiments may include additional filtrate ports and/or different locations for the filtrate ports. Thin film of adhesive 895 is used to seal the perimeter 950 of filtrate port 920 on feed channel spacer 840 and thus create an open interior volume 960. Feed screen 880 is inserted into open volume 960 of feed channel spacers 850. Membrane 860 also preferably includes a centered filtrate port (not shown). Alternate embodiments may include additional filtrate ports and/or different locations for the filtrate ports.

Filtrate channel spacers 840 and feed channel spacers 850 are preferably made of polypropylene, although other materials, as described above for filtration cassette 10, are contemplated and within the scope of the invention. Channel spacers 840 and 850 are preferably die-cut, although other methods of fabrication, as described above for filtration cassette 10, are contemplated and within the scope of the invention.

Filtrate screen 870 and feed screen 880 are preferably made of woven polypropylene, although other materials, as described above for filtration cassette 10, are contemplated and within the scope of the invention. Screens 850 and 880 are preferably die-cut, although other methods of fabrication, as described above for filtration cassette 10, are contemplated and within the scope of the invention. Membrane 860 is preferably made of modified polyethersulfone or regenerated cellulose, although other materials, as described above for filtration cassette 10, are contemplated and within the scope of the invention.

With further reference to FIG. 8, filtration capsule 800 is preferably fabricated by alternating membranes 860 with channel spacers 840 and 850. Preferably, filtrate channel spacers 840 are alternated with feed channel spacers 850 as shown in FIG. 8. Channel spacers 840 and 850 and membranes 860 are positioned such that the filtrate ports are in alignment. Thin film of adhesive 895 in the form of, for example, PSA tape, is applied to channel spacers 840 and 850 to bind the layers of the filtration capsule 800 together.

Although specific features of the invention are shown in some drawings and not others, this is for convenience only, as some feature may be combined with any or all of the other features in accordance with the invention.

Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illustrate the invention and does not pose a limitation on the scope of the invention unless otherwise claimed.

A variety of modifications to the embodiments described will be apparent to those skilled in the art from the disclosure provided herein. Thus, the invention may be embodied in other specific forms without departing from the spirit or essential attributes thereof and, accordingly, reference should be made to the appended claims, rather than to the foregoing specification, as indicating the scope of the invention.

What is claimed is:

1. A cassette comprising:
    one or more filtrate channel spacers, each of the one or more filtrate channel spacers defining an open interior volume bounded by an inner perimeter and including at least one feed port and at least one filtrate port;
    one or more non-flexible feed channel spacers, each of the one or more feed channel spacers defining an open interior volume bounded by an inner perimeter and including at least one feed port and at least one filtrate port;
    one or more membranes disposed between the one or more filtrate channel spacers and the one or more feed channel spacers;
    a thin film of pressure sensitive adhesive binding together the one or more filtrate channel spacers, the one or more feed channel spacers, and the one or more membranes, said thin film of pressure sensitive adhesive having a thickness of less than 50% of height of an adjacent channel;
    one or more retaining members at either end of the cassette; and
    where the one or more filtrate channel spacers and the one or more feed channel spacers are arranged such that the feed ports and the filtrate ports are positioned in respective alignment.

2. The cassette of claim 1, where the pressure-sensitive adhesive comprises a transfer tape applied to a carrier.

3. The cassette of claim 1, where each of the one or more feed channel spacers and each of the one or more filtrate channel spacers further include one or more retentate ports.

4. The cassette of claim 1, further comprising one or more filtrate screens, one or more of the filtrate screens inserted into the open interior volume of one or more filtrate channel spacers.

5. The cassette of claim 1, further comprising one or more feed screens, one or more of the feed screens inserted into the open interior volume of one or more feed channel spacers.

6. The cassette of claim 1, where the one or more membranes comprises a permeable material.

7. The cassette of claim 1, where the one or more retaining members comprise a first and second endplate.

8. The cassette of claim 7, where the first and second endplates are encapsulated into the cassette.

9. The cassette of claim 1, where the inner perimeter of the one or more filtrate channel spacers is shaped to reduce non-uniformities in a filtrate flow through the filtrate channel spacer.

10. The cassette of claim 1, where the inner perimeter of the one or more feed channel spacers is shaped to reduce non-uniformities in a feed flow through the feed channel spacer.

11. The cassette of claim 1, where a height of the feed channel spacer is adjustable.

12. The cassette of claim 1, where a height of the filtrate channel spacer is adjustable.

13. The cassette of claim 1, where the filtrate channel spacer comprises a resilient material.

14. A cassette, comprising:
one or more filtrate channel spacers, each of the one or more filtrate channel spacers defining an open interior volume bounded by an inner perimeter and including at least one feed port, at least one retentate port, and at least one filtrate port;
one or more non-flexible feed channel spacers, each of the one or more feed channel spacers defining an open interior volume bounded by an inner perimeter and including at least one feed port, at least one retentate port, and at least one filtrate port;
one or more membranes, where one membrane is disposed between each of the one or more filtrate channel spacers and each of the one or more feed channel spacers;
a thin film of a pressure-sensitive adhesive, where the adhesive binds together the one or more filtrate channel spacers, the one or more feed channel spacers, and the one or more membranes;
one or more filtrate screens, where one filtrate screen is inserted into the open interior volume of each of the one or more filtrate channel spacers;
a first and second retaining member at either end of the cassette;
where the one or more filtrate channel spacers and the one or more feed channel spacers are arranged such that the feed ports, the retentate ports and the filtrate ports are positioned in respective alignment;
where the inner perimeter of the one or more filtrate channel spacers is shaped to reduce non-uniformities in a filtrate flow through the one or more filtrate channel spacers; and where the inner perimeter of the one or more feed channel spacers is shaped to reduce non-uniformities in a feed flow through the one or more feed channel spacers, and wherein the cassette is disposable.

15. A cassette, comprising:
at least one filtrate channel spacer defining an open interior volume bounded by an inner perimeter and including at least one feed port and at least one filtrate port, where the inner perimeter is shaped to reduce non-uniformities in a filtrate flow through the filtrate channel spacer;
at least one non-flexible feed channel spacer defining an open interior volume bounded by an inner perimeter and including at least one feed port and at least one filtrate port, where the spacer is die-cut to have a uniform inner perimeter thus reducing non-uniformities in a feed flow through the feed channel spacer;
at least one membrane disposed between the at least one filtrate channel spacer and the at least one feed channel spacer;
where the at least one filtrate channel spacer and the at least one feed channel spacer are assembled such that the feed ports and the filtrate ports are positioned in respective alignment;
a thin film of pressure sensitive adhesive, where the thin film of adhesive binds together the at least one filtrate channel spacer, the at least one feed channel spacer, and the at least one membrane; and
a first and second endplate attached at either end of the cassette.

16. The cassette of claim 15, where the first and second endplates further include at least one fluid inlet connection to provide a feed flow into the cassette and at least one fluid outlet connection to provide a filtrate flow out of the cassette.

17. A self-contained filtration assembly, comprising:
a shell having a top portion, a bottom portion, an inlet connection and an outlet connection;
at least one disposable filtration cassette disposed between the top portion of the shell and the bottom portion of the shell;
where the at least one disposable filtration cassette includes one or more non-flexible filtrate channel spacers, each of the one or more filtrate channel spacers defining an open interior volume bounded by an inner perimeter and including at least one feed port and at least one filtrate port, where the inner perimeter is shaped to reduce non-uniformities in a filtrate flow through the filtrate channel spacer,
one or more non-flexible feed channel spacers, each of the one or more feed channel spacers defining an open interior volume bounded by an inner perimeter and including at least one feed port and at least one filtrate port, where the inner perimeter is shaped to reduce non-uniformities in a feed flow through the feed channel spacer,
one or more membranes, the one or more membranes disposed between the one or more filtrate channel spacers and the one or more feed channel spacers,
where the one or more filtrate channel spacers and the one or more feed channel spacers are arranged such that the feed ports and the filtrate ports are positioned in respective alignment, and
a thin film of pressure sensitive adhesive, where the thin film of adhesive binds together the one or more filtrate channel spacers, the one or more feed channel spacers, and the one or more membranes;
where the inlet connection directs a feed flow into the at least one filtration cassette;
the outlet connection directs a filtrate flow out of the at least one filtration cassette; and
the shell and the at least one filtration cassette are bonded together about the periphery.

18. A filtration capsule, comprising:
a housing having at least one inlet connection and at least one outlet connection;
at least one filtrate channel spacer having at least one filtrate port;
at least one non-flexible feed channel spacer having at least one filtrate port;
at least one membrane disposed between the at least one feed channel spacer and the at least one filtrate channel spacer;
a thin film of pressure sensitive adhesive, where the thin film of adhesive binds together the at least one filtrate channel spacer, the at least one feed channel spacer, and the at least one membrane;
where the at least one filtrate channel spacer and the at least one feed channel spacer are disposed in the housing and assembled such that the filtrate ports are positioned in respective alignment;
the at least one inlet connection provides a feed flow to the at least one feed channel spacer; and
the at least one outlet connection provides a filtrate flow from the at least one filtrate channel spacer, said capsule being disposable.

19. The filtration capsule of claim 18, where the pressure-sensitive adhesive comprises a transfer tape applied to a carrier.

20. The filtration capsule of claim 18, where the thin film of adhesive further defines an open interior volume of the at least one feed channel spacer and an open interior volume of the at least one filtrate channel spacer.

21. The filtration capsule of claim 20, further including at least one feed screen inserted into the open interior volume of the at least one feed channel spacer.

22. The filtration capsule of claim 20, further including at least one filtrate screen inserted into the open interior volume of the at least one filtrate channel spacer.

23. A method of fabricating a filtration cassette, comprising:
   applying a thin film of pressure sensitive adhesive to a non-flexible feed channel spacer having at least one feed port and at least one filtrate port;
   applying the thin film of pressure sensitive adhesive to a filtrate channel spacer having at least one feed port and at least one filtrate port;
   disposing a membrane between the feed channel spacer and the filtrate channel spacer;
   arranging the feed channel spacer, the membrane, and the filtrate channel spacer such that the feed ports and the filtrate ports are in respective alignment; and
   binding the feed channel spacer, the membrane, and the filtrate channel spacer together with the thin film of pressure sensitive adhesive.

24. A method of fabricating a filtration capsule, comprising:
   applying a thin film of pressure sensitive adhesive to a non-flexible feed channel spacer having at least one filtrate port;
   applying the thin film of pressure sensitive adhesive to a filtrate channel spacer having at least one filtrate port;
   disposing a membrane between the feed channel spacer and the filtrate channel spacer;
   arranging the feed channel spacer, the membrane, and the filtrate channel spacer such that the filtrate ports are in respective alignment;
   disposing the feed channel spacer, the membrane, and the filtrate channel spacer in a housing; and
   binding the feed channel spacer, the membrane, and the filtrate channel spacer together with the thin film of pressure sensitive adhesive.

25. The cassette according to claim 1, wherein the thin film of adhesive has a thickness of 0.002 to 0.005 inches.

\* \* \* \* \*